United States Patent [19]
Hardy et al.
[11] 3,741,475
[45] June 26, 1973

[54] SUMMING ARRANGEMENTS

[75] Inventors: Pierre Hardy; Leon Hardy, both of Paris; Simeon Lekarski, Saint-Cloud, all of France

[73] Assignee: Jean Gachot, Enghlien-les-Bains, France; a part interest

[22] Filed: Aug. 4, 1971

[21] Appl. No.: 168,905

[30] Foreign Application Priority Data
Aug. 5, 1970 France .............................. 7028920

[52] U.S. Cl............ 235/175, 235/172, 235/201 ME
[51] Int. Cl....... G06f 7/385, G06d 1/04, F15c 4/00
[58] Field of Search.................... 235/175, 176, 172, 235/201 ME

[56] References Cited
UNITED STATES PATENTS
3,636,334 1/1972 Svoboda ............................ 235/175

Primary Examiner—Malcolm A. Morrison
Assistant Examiner—R. Stephen Dildine, Jr.
Attorney—John Lezdey

[57] ABSTRACT

A summing arrangement is described in which numbers represented by binary signals are summed by using threshold devices. The threshold devices each have a plurality of inputs which are connected to receive the input signals. Since all the threshold devices have different threshold criteria, the number of threshold devices energised will vary in accordance with the number of signals present at the inputs and thus provide an indication of the sum of the signals received. Logic circuits are then used to convert this information into a binary output. The threshold devices can comprise fluidically operated devices.

10 Claims, 6 Drawing Figures

Inventors
Siméon Lekarski, Pierre Hardy, & Léon Hardy
By John Lezdey
Attorney

Inventors
Siméon Lekarski, Pierre
Hardy, & Léon Hardy
By John Lezdey
Attorney

Inventors
Siméon Lekarski, Pierre Hardy, & Léon Hardy
By John Lezdey
Attorney

SUMMING ARRANGEMENTS

BACKGROUND OF THE INVENTION

1. Field of the invention

The present invention relates to summing arrangements.

2. Description of the prior art

Previously proposed summing arrangements have included an array of logic elements connected to a plurality of inputs to perform additions of input signals. These arrangements suffer from the disadvantage that they are complex since they must cater for the addition of signals present at every combination of inputs and time is wasted in the process of adding when no signals are present at the inputs being added.

Analog elements can perform the same functions, but they receive information in the form of continuous signals proportional to the information and the signals obtained at the output are likewise in continuous form. It is necessary to carry out conversion such as coding, decoding or changing the numerical analogue value and reciprocal.

It is an object of the invention to provide an improved summing arrangement.

SUMMARY OF THE INVENTION

The present invention provides a summing arrangement having a plurality of main inputs and operative to produce an output signal indicative of the number of main inputs energised, comprising a plurality of threshold elements each having a plurality of inputs and an output and operative to energise its output when at least a predetermined number, different for each threshold element, of its inputs is energised, means respectively connecting the inputs of each threshold element to a greater number of the main inputs than its respective said predetermined number whereby different combinations of the threshold elements energise their outputs for different numbers of main inputs energised, and logic elements connected to the outputs of the threshold elements in a manner such as to produce the said output signal.

BRIEF DESCRIPTION OF THE DRAWINGS

Summing arrangements embodying the invention will now be described, by way of example, with reference to the accompanying diagrammatic drawings, in which.

DESCRIPTION OF THE PREFERRED EMBODIMENTS

Figure 1:
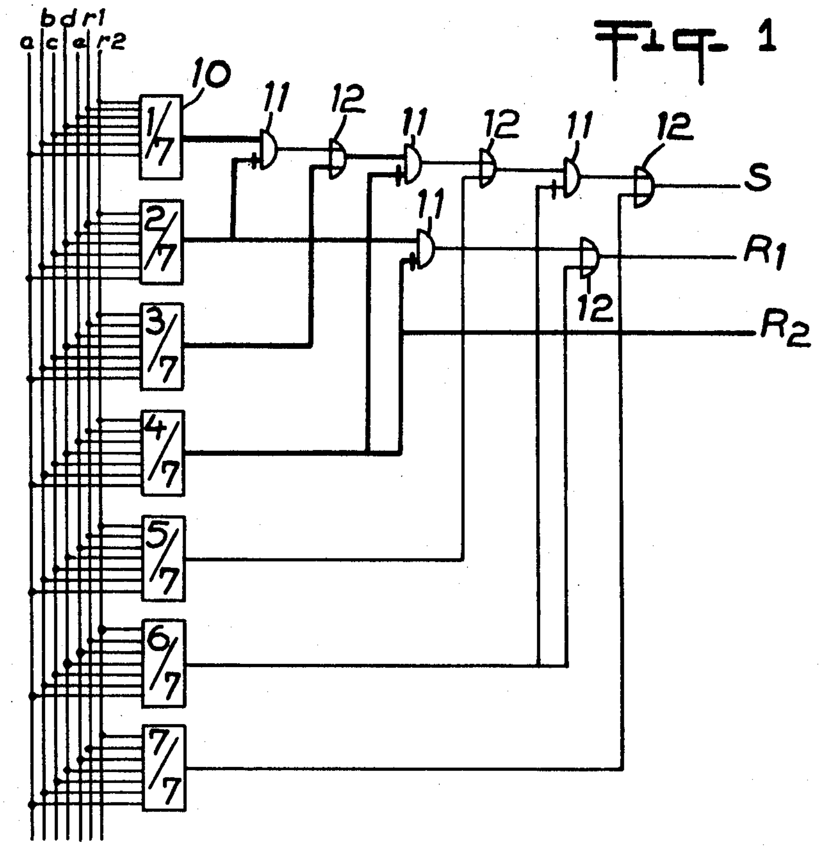
FIG. 1 is a diagrammatic representation of a functional operator adding five binary numbers together simultaneously.

FIG. 1 shows the layout of one form of binary adder, which can add together simultaneously five numbers, *a*, *b*, *c*, *d* and *e*, and two carries $r_1$ and $r_2$, from the preceding operation (for example, the adder illustrated could form one stage of an arrangement for adding five binary numbers, each number comprising a plurality of bits).

This adder has seven threshold elements, 10, of the *m/n* type, in which the number *n* of inputs is fixed at seven and the number *m* or threshold varies from one to seven.

In these *m/n* threshold elements with *n* inputs, the output S has a value 1 if, and only if, the number of input variables is equal to or greater than the number *m* by which the threshold of a particular element is determined.

The 1/7 element acts as a seven-input OR element and the 7/7 element as a seven-input AND element.

Each element 10 is connected by its seven inputs to the lines of the signals *a*, *b*, *c*, *d*, *e*, $r_1$ and $r_2$ in a network.

The outputs of the elements 10 are connected to logic elements 11 each in the form of an INHIBIT gate having the logic function NO and to logic elements 12 having the function OR, which are joined up in such a way as to obtain on the adder an output S giving the state of the adder and two carries $R_1$ and $R_2$, to be added to the addition of next higher order.

To illustrate the mode of operation of the adder, the following table shows the state of the outputs for the addition of five numbers, *a*, *b*, *c*, *d* and *e*, with two carries $r_1$ and $r_2$ from the preceding operation.

| | a | b | c | d | e | $r_1$ | $r_2$ | S | $R_1$ | $R_2$ |
|---|---|---|---|---|---|---|---|---|---|---|
| 1 | x | | | | | | | x | | |
| 2 | | x | | | | | | x | | |
| 3 | | | x | | | | | x | | |
| 4 | | | | x | | | | x | | |
| 5 | | | | | x | | | x | | |
| 6 | | | | | | x | | x | | |
| 7 | | | | | | | x | x | | |
| 8 | x | x | | | | | | | x | |
| 9 | | x | x | | | | | | x | |
| 10 | | | x | x | | | | | x | |
| 11 | | | | x | x | | | | x | |
| 12 | | | | | x | x | | | x | |
| 13 | | | | | | x | x | | x | |
| 14 | x | | x | | | | | | x | |
| 15 | | x | | x | | | | | x | |
| 16 | | | x | | x | | | | x | |
| 17 | | | | x | | x | | | x | |
| 18 | | | | | x | | x | | x | |
| 19 | x | | | x | | | | | x | |
| 20 | | x | | | x | | | | x | |
| 21 | | | x | | | x | | | x | |
| 22 | x | x | x | | | | | x | x | |

The number of combinations being extremely large, the table has been restricted to 22 combinations, so as to show that the state of the adder outputs changes only when variation occurs in the total number of variables having the value 1. The state of the outputs related to the number of inputs are shown in the table below.

| Number of inputs of value 1 | S | $R_1$ | $R_2$ |
|---|---|---|---|
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

It is clear, then that with two carries one can add seven variables, five of which are active, while two represent the carries from the preceding operation.

To show one example of utilisation, a certain number of connections in the FIG. 1 layout have been drawn in thickened line to indicate the lines under pressure (in the case of pneumatic threshold elements) assuming there are four signals present at any of the inputs.

In that case, the threshold elements 10 having the characteristics 1/7, 2/7, 3/7 and 4/7, which have a threshold equal to or less than four, are open. The connections of the NO elements 11 and the OR elements 12 are such as to allow passage of the signal only to the output $R_2$, as indicated in the foregoing table.

Adders having a modified layout and employing *m/n* elements, of course, are capable of simultaneously adding together fewer than 7 or more than 7 signals.

Thus,for example, an adder intended for adding two active signals and one carry will have three *m/*3 elements, one NO element and one OR element.

Comparison of the adder illustrated with other addition circuits shows that the former contains approximately three times fewer elements. The result is faster calculation, greater reliability and lower cost price.

Figure 2:
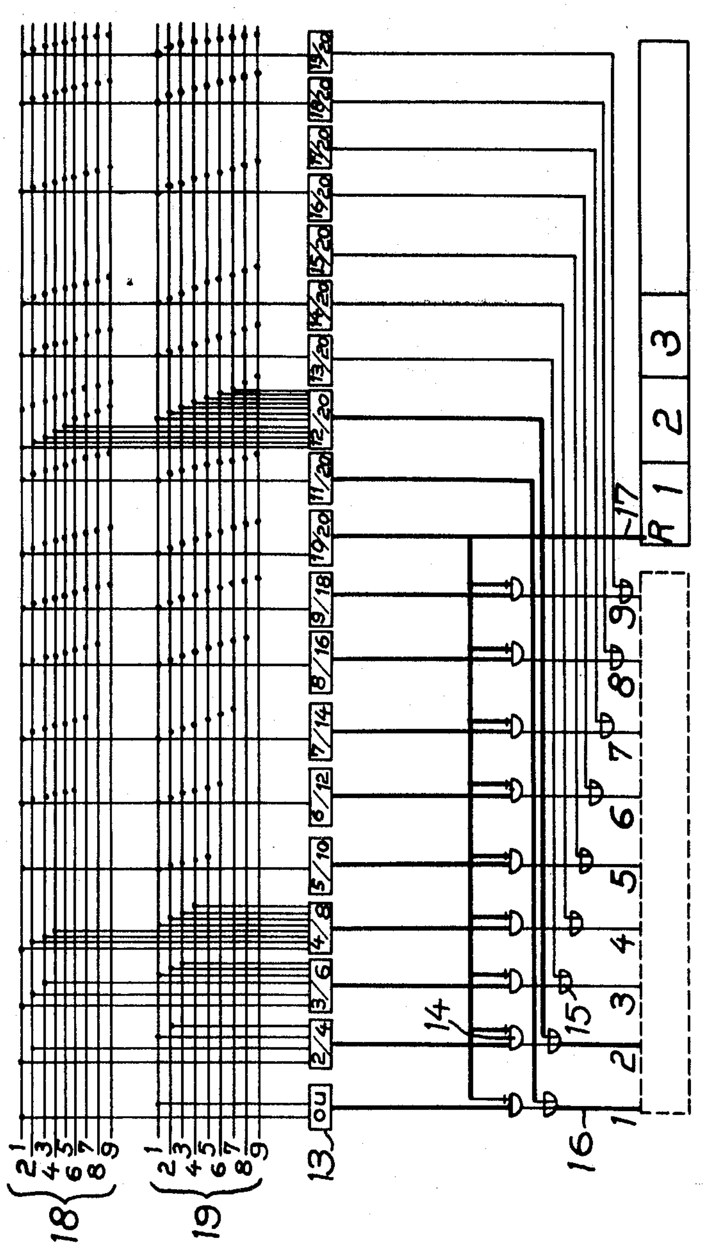
FIG. 2 is a diagrammatic representation of a functional operator adding two decimal numbers together simultaneously.

FIG. 2 shows the layout for a decimal-code adder in which groups of lines are produced numbered 1 to 9, and the decimal number represented by each group is indicated by the number of lines energised starting from the line numbered 1, as shown by the Table below.

| Decimal Number Represented | Lines Energized | | | | | | | | | |
|---|---|---|---|---|---|---|---|---|---|---|
| | 1 | 2 | 3 | 4 | 5 | 6 | 7 | 8 | 9 | R |
| 1 | x | | | | | | | | | |
| 2 | x | x | | | | | | | | |
| 3 | x | x | x | | | | | | | |
| 4 | x | x | x | x | | | | | | |
| 5 | x | x | x | x | x | | | | | |
| 6 | x | x | x | x | x | x | | | | |
| 7 | x | x | x | x | x | x | x | | | |
| 8 | x | x | x | x | x | x | x | x | | |
| 9 | x | x | x | x | x | x | x | x | x | |
| 10 | | | | | | | | | | x |

As shown in the Table, each group of lines also includes a line R which is energised to indicate a carry.

The adder shown in layout form in FIG. 2 has nineteen threshold elements, 13, of *m/n* type, in which *m* varies between 1 and 20, nine logic elements 14 having the function NO and nine logic elements 15 having the function OR. The threshold elements 13 are connected selectively to two input registers or line groups 18 and 19. Half the total number of inputs of each threshold element 13 are connected to respective lines in the register 18 and the other half are connected to respective lines in the register 19 (in each case using the lowest numbered lines in each register), but some of the connections are omitted for the sake of clarity.

This adder has a group of ten output lines, of which the nine numbered 16 represent the result of addition, while the one numbered 17 represents the state of the carry. Those parts of the circuit drawn in thickened line correspond to the operation of the adder when the number 5 is in the first input register 18 and the number 7 is in the second register 19.

In that case, the sum obtained is 12, represented by "1" signals at the first two outputs and a "1" carry on the line 17.

Figure 3:
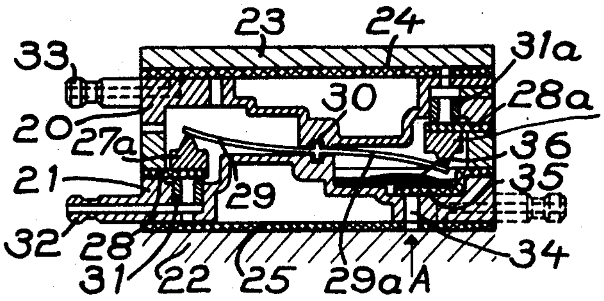
FIG. 3 is a sectional view of a pneumatic *m/n* element in which flat springs are used.
Figure 4:
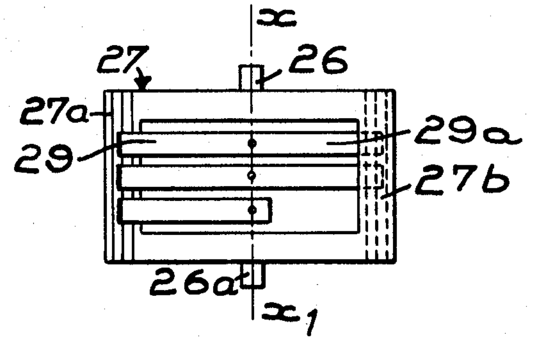
FIG. 4 is a plan of the operating lever and springs used in the element shown in FIG. 3.

FIGS. 3 and 4 show one form of pneumatic element of *m/n* type.

When the element is used for *m/n* working, the number *m* corresponds to the threshold of the equipment and the number *n* to the total number of inputs.

The element appearing in FIGS. 3 and 4 may theoretically have an unlimited number of inputs, but in practice this number depends on the dimensional limits to which the designer has to work and on the precision of the threshold.

The *m/n* element in FIGS. 3 and 4 comprises a casing consisting mainly of two identical members 20 and 21, disposed symmetrically and secured to a baseplate 22, a sheet of resilient sealing material, 25, being interposed. The member 20 is fitted with a cap 23, a sheet of resilient sealing material being interposed at 24.

Mounted in recesses (not shown) within the members 20 and 21 is a lever 27 mounted on pivot pins 26 and 26*a* (FIG. 4), this lever being in a form of a double yoke, the arms 27*a* and 27*b* of which are held in contact with valves 28 and 28*a*, consisting of strips of rubber, by a series of flat springs 29 and 29*a*. The central portions of these springs 29 and 29*a* carry studs 30 engaged in corresponding openings in the casing members 20 and 21. The valves 28 and 28*a* bear on seatings 31 and 31*a* corresponding to two series of input apertures. Connection of the input signals can be effected either through the channelled connectors 32 and 33 forming part of the casing members 21 and 20 or through the baseplate 22.

By removing or adding springs 29 and 29*a*, the force exerted on the lever 27 can be varied in stages, the opening threshold of the unit being thereby regulated.

According to the number of springs 29 and 29*a* fitted, the input apertures will open when the same number of high-pressure fluid signals arise at the inputs. Should there be five springs (FIG. 4) and a total of seven inputs, the result will be an element having a threshold of 5, that is to say a 5/7 element.

The opening of the element is marked by movement of the lever 27 in a clockwise direction, which allows the valves 28 and 28*a* to open at inputs carrying "1" signals. The fluid passes towards the output, making use of one of the apertures in seatings 31 and 31*a* on which no valves 28 or 28*a* are fitted. The purpose of the valves 28 and 28*a* is to prevent the output signal from escaping through non-energised inputs and they are of the non-return type. The arrangement of the lever 27 and springs 29 and 29*a* is symmetrical about an axis, $x$–$x_1$, so as to eliminate threshold variations due to mechanical acceleration.

The member 21 contains an aperture 34 against which a strip of rubber forming a valve 35 is held by a spring 36. This strip 35 can be controlled by external mechanical means, indicated by the arrow A, and serves to close all the apertures and the escape of the output signal through the aperture 34.

Figure 5:
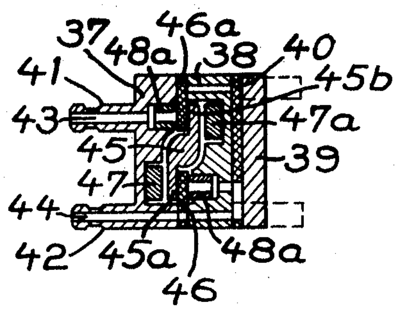
FIG. 5 is a sectional view of a magneto-fluid *m/n* element.
Figure 6:
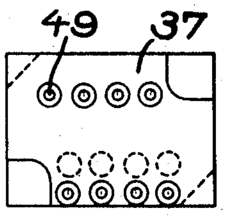
FIG. 6 is a side view of the element shown in FIG. 5.

FIGS. 5 and 6 show another form of *m/n* element comprising a casing consisting of two members 37 and 38 mounted on a baseplate 39, with an interposed seal 40, the member 37 being provided with connectors 41 and 42, for inputs or outputs 41 and 42.

Pivoted in the casing made up of the members 37 and 38 is a double lever 45 made of magnetic material, the two arms 45*b* and 45*a* of which are held against valves 46 and 46*a* by the magnetic force of permanent magnets 47 and 47*a*.

The valves 46 and 46*a* themselves bear on seatings 48 and 48*a* corresponding to the different inputs of the element.

The force applied to the lever 45 can be varied by replacement of the magnets, which may be of different magnetic strengths, or by the fitting of shims under the magnets so as to alter the gap. This element may also include a mechanical means of re-setting to zero.

As can be seen in FIG. 6, out of eight apertures 49, seven are being used for inputs and one for output.

The functional operators here proposed may have pneumatically operated *m/n* elements as described above, but naturally they can also be electrically operated without altering the sphere of application of the present invention.

WE CLAIM:

1. A summing arrangement having a plurality of main inputs and operative to produce an output signal indicative of the number of main inputs energized, comprising a plurality of threshold elements each having a plurality of inputs and an output and operative to energize its output when at least a predetermined number, different for each threshold element, of its inputs is energized, means respectively connecting the inputs of each threshold element to a greater number of the main inputs than its respective said predetermined number whereby different combinations of the threshold elements energize their outputs for different numbers of main inputs energized, and logic elements connected to the outputs of the threshold elements in such a manner as to produce said output signal, said logic elements comprising at least one INCLUSIVE or gate, and at least one INHIBIT gate.

2. An arrangement according to claim 1, in which each threshold element has as many inputs as there are main inputs, and the connecting means connects each of said threshold element inputs to a respective main input, whereby said output signal comprises a binary number representing the number of inputs energized.

3. An arrangement according to claim 2, in which the logic elements comprise a series of INHIBIT gates each having its output connected to the non-inhibiting one of the inputs of another thereof via a respective two-input OR gate, the first INHIBIT gate in the series having its non-inhibiting input connected to the output of the threshold element having the lowest predetermined number, a further two-input OR gate having one of its inputs connected to the output of the last INHIBIT gate in the said series and its output connected to generate one binary part of the said output signal, means connecting the inhibiting input of the first INHIBIT gate of the said series to the output of the threshold element having the second lowest predetermined number, means respectively connecting the inhibiting inputs of the following INHIBIT gates in the said series to the outputs of alternate ones of the threshold elements in ascending order of predetermined number, means respectively connecting the second inputs of the said OR gates to the outputs of the intervening ones of the threshold elements in ascending order of predetermined number, a further INHIBIT gate having its non-inhibiting input connected to the output of the threshold element having the second lowest predetermined number and its inhibiting input connected to the output of the threshold element having the fourth lowest predetermined number, a further two-input OR gate having one of its inputs connected to the output of the further INHIBIT gate, its other input connected to the output of the threshold element having the sixth lowest predetermined number, and its output connected to generate another binary part of the said output signal, and means connecting the output of the threshold element having the fourth lowest predetermined number to generate a further binary part of the output signal.

4. A summing arrangement according to claim 1 for adding decimal numbers represented in binary form by energisation of particular ones of the main inputs, in which the inputs of the threshold elements are connected to different combinations of the main inputs.

5. A summing arrangement according to claim 1 for adding two decimal numbers each of which is represented in binary form by energization of a corresponding number of inputs in a respective group of said main inputs connected from the first input in the group, in which each threshold element has half its inputs respectively connected to main inputs in one of said group and the other half respectively connected to main inputs in the other of said group, each threshold element having an even number of inputs but not all having the same number of inputs.

6. A summing arrangement according to claim 5, in which the logic elements comprise a plurality of INHIBIT gates each having its noninhibiting input connected to the output of a respective one of the threshold elements whose said predetermined numbers lie in the range 1 through 9 inclusive, a plurality of two-input INCLUSIVE OR gates each having one of its inputs connected to the output of a respective one of the INHIBIT gates and its output connected to feed a respective one of a group of output lines whereon are generated binary signals representing in decimal form said output signal, means connecting the output of the threshold element whose said predetermined number is ten to the inhibit inputs of all the INHIBIT gates, and to a further one of said group of output lines, and means connecting the outputs of the remaining threshold elements to the second inputs of the INCLUSIVE OR gates.

7. An arrangement according to claim 1, in which each threshold element comprises a fluidic device including a housing having *n* input apertures, each aperture being closable by a valve, and biasing means acting simultaneously on all the valves to tend to maintain the valves closed, the biasing means acting on the valves with only sufficient force to hold the valves closed if less than *m* of the *n* inputs are supplied with fluidic signals.

8. An arrangement according to claim 7, in which said biasing means comprises a pivotally mounted yoke pivotable into a position in which it closes said valves, and an array of *m* resilient members urging said yoke into said position.

9. An arrangement according to claim 7, including an output aperture closed by an output valve, the output valve being maintained closed when fluidic pressure enters the device through the input apertures, and means operable to open the output valve to determine whether the threshold level of the valve has been exceeded.

10. An arrangement according to claim 7, wherein said biasing means comprises a pivotal member and magnetic means which cooperates magnetically with the pivotal member to close said valves.

* * * * *